US009944448B2

(12) United States Patent
Lopez et al.

(10) Patent No.: US 9,944,448 B2
(45) Date of Patent: Apr. 17, 2018

(54) CONTAINER

(71) Applicant: Belron Hungary KFT - Zug Branch, Zug (CH)

(72) Inventors: Alain Lopez, Barcelona (ES); Enoc Bofill, Barcelona (ES)

(73) Assignee: Belron International Limited, Egham (GB)

( * ) Notice: Subject to any disclaimer, the term of this patent is extended or adjusted under 35 U.S.C. 154(b) by 172 days.

(21) Appl. No.: 14/375,610

(22) PCT Filed: Feb. 6, 2013

(86) PCT No.: PCT/EP2013/052288
§ 371 (c)(1),
(2) Date: Jul. 30, 2014

(87) PCT Pub. No.: WO2013/117569
PCT Pub. Date: Aug. 15, 2013

(65) Prior Publication Data
US 2015/0016928 A1     Jan. 15, 2015

(30) Foreign Application Priority Data

Feb. 10, 2012   (GB) .................................. 1202328.9

(51) Int. Cl.
*A47J 19/00*     (2006.01)
*B65D 81/00*     (2006.01)
(Continued)

(52) U.S. Cl.
CPC ............. *B65D 81/00* (2013.01); *B62B 3/002* (2013.01); *B62B 3/16* (2013.01); *B65D 7/02* (2013.01);
(Continued)

(58) Field of Classification Search
CPC ........ B65D 19/06; B65D 19/42; B65D 85/48; B65D 81/00; B65D 7/00; B65D 90/0006;
(Continued)

(56) References Cited

U.S. PATENT DOCUMENTS 1,149,639 A * 8/1915 Doust ....................... B62B 3/00
                                              211/134
1,232,537 A * 7/1917 Hammond .............. B62B 3/002
                                              16/18 R
(Continued)

FOREIGN PATENT DOCUMENTS

BE              792929        4/1973
EP         1 737 764 B1      11/2008
(Continued)

*Primary Examiner* — Shawn M Braden
(74) *Attorney, Agent, or Firm* — Gordon & Jacobson, P.C.

(57) ABSTRACT

A container (1) for transportation and/or storage of items is provided with under-slung lifting formations (8, 9) for aiding lifting of the container, rotatable support members (10, 11) upon which the container may be moved, and/or means (17) for securing like containers positioned in side by side relationship to be releasably secured to one another. The invention enables securing together containers in side by side relationship and moving/lifting the containers together between picking or loading locations. Following loading of the containers with at least some material at the distributed picking/loading locations, the containers may be disengaged and separated for onward transportation in separation.

17 Claims, 6 Drawing Sheets

(51) Int. Cl.
  *B62B 3/16* (2006.01)
  *B65D 19/06* (2006.01)
  *B62B 3/00* (2006.01)
  *B65D 19/42* (2006.01)
  *B65D 6/02* (2006.01)

(52) U.S. Cl.
  CPC ............. *B65D 19/06* (2013.01); *B65D 19/42* (2013.01); *B62B 2203/28* (2013.01); *B62B 2207/02* (2013.01); *B65D 2519/0082* (2013.01); *B65D 2519/0097* (2013.01); *B65D 2519/00273* (2013.01); *B65D 2519/00323* (2013.01); *B65D 2519/00338* (2013.01); *B65D 2519/00502* (2013.01); *B65D 2519/00532* (2013.01); *B65D 2519/00626* (2013.01); *B65D 2519/00666* (2013.01); *B65D 2519/00701* (2013.01); *B65D 2519/00746* (2013.01); *B65D 2519/00781* (2013.01); *B65D 2519/00796* (2013.01); *B65D 2585/6887* (2013.01)

(58) Field of Classification Search
  CPC ...... B65D 88/022; B65D 88/027; B62B 3/00; B62B 3/002; B62B 3/16; B62B 3/02; B62B 5/049
  USPC .................................................. 220/23.4, 9.2
  See application file for complete search history.

(56) References Cited

U.S. PATENT DOCUMENTS

| | | | | |
|---|---|---|---|---|
| 1,642,712 A | * | 9/1927 | Angers | B62B 3/00 16/18 B |
| 1,649,065 A | * | 11/1927 | Jarvis | B62B 3/00 280/79.2 |
| 1,649,946 A | * | 11/1927 | Brostedt | B62B 3/00 16/44 |
| 1,655,174 A | * | 1/1928 | White | B62B 5/082 16/259 |
| 1,706,690 A | * | 3/1929 | Boyuls | B62B 3/00 211/1 |
| 1,912,847 A | * | 6/1933 | Klepel | B62B 3/16 108/53.1 |
| 2,367,082 A | * | 1/1945 | Amidon | B62B 3/00 211/123 |
| 2,413,164 A | * | 12/1946 | Boldt | A47B 31/02 296/22 |
| 2,446,137 A | * | 7/1948 | Krueger | B62B 3/00 280/47.371 |
| 2,468,375 A | * | 4/1949 | Paddock | B62B 3/00 280/47.16 |
| 2,513,258 A | * | 6/1950 | Ulrich | B60D 1/481 280/491.3 |
| 2,535,457 A | * | 12/1950 | Roberts | B62B 3/00 280/47.34 |
| 2,572,780 A | * | 10/1951 | Tackenberg | B62B 3/02 108/57.15 |
| 2,658,224 A | * | 11/1953 | Brown | A47L 9/009 15/246.4 |
| 2,661,958 A | * | 12/1953 | Stokes | B62B 3/00 280/29 |
| 2,707,585 A | * | 5/1955 | Hoey | B62B 3/00 182/127 |
| 2,726,095 A | * | 12/1955 | Emery | B62B 3/00 217/43 R |
| 2,738,201 A | * | 3/1956 | Spears | B62B 3/1476 280/33.996 |
| 2,819,908 A | * | 1/1958 | Jackson | B62B 3/00 211/150 |
| 2,830,362 A | * | 4/1958 | Bennett | B60D 1/565 228/142 |
| 2,839,198 A | * | 6/1958 | Lefevre | B65D 85/48 108/55.1 |
| 2,862,720 A | * | 12/1958 | Stone | B62B 3/02 108/53.1 |
| 2,962,292 A | * | 11/1960 | Edmonston | B62B 1/002 280/33.996 |
| 2,974,917 A | * | 3/1961 | Kappen | B62B 1/20 108/19 |
| 3,001,797 A | * | 9/1961 | Kappen | B62B 1/08 280/46 |
| 3,007,708 A | * | 11/1961 | Ochs | A47B 55/02 108/107 |
| 3,093,261 A | * | 6/1963 | Salat | B62B 3/002 211/181.1 |
| 3,132,875 A | * | 5/1964 | Plumly | B62B 3/00 280/47.34 |
| 3,137,250 A | * | 6/1964 | Hutchinson | B62B 3/002 108/156 |
| 3,140,673 A | * | 7/1964 | Williams | B65D 19/16 108/53.5 |
| 3,147,860 A | * | 9/1964 | Kean, Sr. | B65D 19/08 108/53.5 |
| 3,160,292 A | * | 12/1964 | Albrecht | A47F 10/04 186/52 |
| 3,176,632 A | * | 4/1965 | Yingling | B65D 19/42 108/54.1 |
| 3,208,768 A | * | 9/1965 | Hulbert | B60D 1/00 280/408 |
| 3,233,753 A | * | 2/1966 | Rich | B65D 85/48 206/454 |
| 3,240,505 A | * | 3/1966 | Schlernitzauer | A22C 15/003 211/201 |
| 3,240,507 A | * | 3/1966 | Braun | B62B 3/002 211/150 |
| 3,261,616 A | * | 7/1966 | Mason | B62B 3/16 211/1 |
| 3,266,813 A | * | 8/1966 | Bosko | B62B 3/00 280/47.11 |
| 3,273,706 A | * | 9/1966 | Bundy | B65D 85/48 206/451 |
| 3,277,848 A | * | 10/1966 | Runge | B65D 19/06 108/55.1 |
| 3,295,861 A | * | 1/1967 | Lull | B62B 3/00 188/19 |
| 3,307,895 A | * | 3/1967 | Renner | A47B 31/00 312/295 |
| 3,313,378 A | * | 4/1967 | Jeffery | B62B 3/002 188/21 |
| 3,336,043 A | * | 8/1967 | Boeye | B62B 3/002 217/17 |
| 3,415,532 A | * | 12/1968 | Fingerut | A47F 5/135 280/33.998 |
| 3,420,379 A | * | 1/1969 | Berryman | B62B 3/002 211/1 |
| 3,523,694 A | * | 8/1970 | Oliver | A47B 87/0207 108/53.3 |
| 3,540,614 A | * | 11/1970 | Flagg | B62B 3/002 16/422 |
| 3,582,102 A | * | 6/1971 | Bewick | B62B 5/0093 108/53.3 |
| 3,589,746 A | * | 6/1971 | Inglis | A47B 57/12 108/181 |
| 3,608,920 A | * | 9/1971 | Rubin | B62B 3/16 280/33.998 |
| 3,608,921 A | * | 9/1971 | Wilson | B62B 3/00 280/79.11 |
| 3,628,805 A | * | 12/1971 | Archer | B62B 3/16 108/53.1 |
| 3,698,733 A | * | 10/1972 | Isaacs | B62B 3/002 206/511 |
| 3,746,358 A | * | 7/1973 | Swick, Jr. | B62B 3/02 280/651 |
| 3,782,746 A | * | 1/1974 | Isaacs | B62B 3/002 280/33.996 |
| 3,809,234 A | * | 5/1974 | Kurick | B65G 49/062 206/386 |
| 3,827,573 A | * | 8/1974 | Guerette | B62B 3/025 108/177 |

(56) References Cited

U.S. PATENT DOCUMENTS

| | | | | |
|---|---|---|---|---|
| 3,840,243 A * | 10/1974 | Rheinhart | ............... | B62B 3/002 280/33.996 |
| 3,861,704 A * | 1/1975 | De Witte | ................ | B62B 3/002 280/79.3 |
| 3,887,207 A * | 6/1975 | Gotsch, Jr. | ................ | B62B 3/10 108/187 |
| 3,891,228 A * | 6/1975 | Rhinehart | ................ | B62B 3/002 211/149 |
| 3,893,686 A * | 7/1975 | Morgan | ................ | B62B 3/002 280/651 |
| 3,927,764 A * | 12/1975 | Fox | ........................ | B65D 85/48 206/451 |
| 3,953,047 A * | 4/1976 | Morgan | .................... | B62B 3/16 280/33.998 |
| 4,004,819 A * | 1/1977 | Brongo | .................... | A21B 1/50 211/181.1 |
| 4,109,926 A * | 8/1978 | Lane | ........................ | B62B 3/002 280/39 |
| 4,127,188 A * | 11/1978 | Heaney | .............. | B65D 71/0092 206/325 |
| 4,209,183 A * | 6/1980 | Jones | ...................... | B62B 3/002 108/55.1 |
| 4,504,073 A * | 3/1985 | Isaacs | ...................... | B62B 3/00 280/33.992 |
| 4,641,845 A * | 2/1987 | Hewitt | ...................... | B62B 3/16 280/79.11 |
| 4,863,179 A * | 9/1989 | Isaacs | ...................... | B60D 1/00 280/33.996 |
| 4,978,013 A * | 12/1990 | Hogg | ........................ | A47F 5/13 211/132.1 |
| 5,123,552 A * | 6/1992 | Aggelen | .................. | A47B 7/02 211/126.5 |
| 5,145,073 A * | 9/1992 | Kitagawa | ............... | B65D 85/48 206/448 |
| 5,186,330 A * | 2/1993 | McClure | .................. | B62B 3/16 206/508 |
| 5,238,128 A * | 8/1993 | Stoddard | ................ | A47F 5/005 211/133.1 |
| 5,257,794 A * | 11/1993 | Nakamura | ................ | B62B 3/00 211/182 |
| 5,263,701 A * | 11/1993 | Kleinhen | ................ | B62B 3/008 220/4.28 |
| 5,330,064 A * | 7/1994 | Hall | ........................ | A47F 5/135 16/29 |
| 5,379,904 A * | 1/1995 | Brown | ................... | B65D 85/48 211/175 |
| 5,388,532 A * | 2/1995 | Wakano | .................. | B65D 19/12 108/54.1 |
| 5,427,394 A * | 6/1995 | Lauto | ........................ | B62B 3/02 280/33.998 |
| 5,445,396 A * | 8/1995 | Sebor | ........................ | B62B 3/16 108/53.3 |
| 5,531,464 A * | 7/1996 | Maurer | .................... | B62B 3/00 211/126.15 |
| 5,556,118 A * | 9/1996 | Kern | ........................ | B62B 3/00 280/47.16 |
| 5,611,554 A * | 3/1997 | Eckloff | .................... | B62B 3/00 280/47.34 |
| 5,947,494 A * | 9/1999 | Thogersen | ................ | A47B 31/06 280/47.35 |
| 6,022,033 A * | 2/2000 | Landesman | ............... | B62B 3/006 280/47.35 |
| 6,073,786 A * | 6/2000 | McCorkle, Jr. | ........... | A47B 57/04 211/181.1 |
| 6,364,137 B1 * | 4/2002 | Glauth | .................... | A47F 5/137 211/126.9 |
| 6,364,330 B1 * | 4/2002 | Weber | ........................ | B62B 1/10 108/136 |
| 6,402,167 B1 * | 6/2002 | Calleja | .................... | B62B 3/006 108/55.1 |
| D530,053 S * | 10/2006 | Bothun | ........................ | D34/17 |
| 7,419,063 B1 * | 9/2008 | Hall | ........................ | A21B 1/44 211/126.1 |
| 7,549,654 B2 * | 6/2009 | Anderson | ............... | B62B 3/006 211/85.24 |
| 7,914,018 B1 * | 3/2011 | Rezler | .................... | B62B 3/002 280/79.11 |
| D697,684 S * | 1/2014 | Tiilikainen | .................... | D34/17 |
| 8,739,986 B2 * | 6/2014 | Preidt | ........................ | A47F 5/00 108/187 |
| 8,931,420 B2 * | 1/2015 | Larson | .................... | B62B 3/02 108/54.1 |
| 2002/0109319 A1 * | 8/2002 | Neal | ........................ | B62B 1/10 280/47.35 |
| 2002/0121493 A1 * | 9/2002 | Wang | ........................ | A47F 7/19 211/195 |
| 2003/0006586 A1 * | 1/2003 | Comilla | ................ | B62B 3/002 280/651 |
| 2003/0030239 A1 * | 2/2003 | Woerner | ................. | B62B 3/002 280/47.35 |
| 2004/0090028 A1 * | 5/2004 | Trogstam | ............... | A01K 1/031 280/79.3 |
| 2005/0179235 A1 * | 8/2005 | Stewart | ................ | B60J 7/1614 280/656 |
| 2005/0183375 A1 * | 8/2005 | Yamamoto | ............. | B65D 19/10 52/633 |
| 2005/0218617 A1 * | 10/2005 | Frahm | ...................... | B60D 1/00 280/79.3 |
| 2006/0055135 A1 * | 3/2006 | Tracewell | ............... | B62B 3/006 280/47.35 |
| 2008/0110905 A1 * | 5/2008 | Cowie | ...................... | B65D 90/16 220/636 |
| 2008/0265538 A1 * | 10/2008 | Hailston | .................. | B62B 3/008 280/47.34 |
| 2009/0078700 A1 * | 3/2009 | Boivin | .................... | B65D 19/42 220/4.28 |
| 2010/0109268 A1 * | 5/2010 | Koehler | .................. | B62B 3/008 280/33.991 |
| 2011/0097186 A1 * | 4/2011 | Gibson | .................... | B65D 85/48 414/800 |
| 2013/0075993 A1 * | 3/2013 | Christie | ................... | B62B 3/16 280/79.3 |
| 2013/0121800 A1 * | 5/2013 | Hacko | ................... | B62B 5/0433 414/800 |
| 2013/0221630 A1 * | 8/2013 | Tavolino | ................ | B65D 7/12 280/79.2 |
| 2013/0233811 A1 * | 9/2013 | Glover | ................... | B65D 19/12 211/41.14 |

FOREIGN PATENT DOCUMENTS

| | | |
|---|---|---|
| EP | 2 042 403 A2 | 4/2009 |
| GB | 2 189 198 A | 10/1987 |
| GB | 2 190 895 A | 12/1987 |
| GB | 2 480 673 A | 11/2011 |

* cited by examiner

CONTAINER

CROSS-REFERENCE TO RELATED APPLICATIONS

This application is the national stage of International Patent Application No. PCT/EP/2013/052288 filed on Feb. 6, 2013, which claims priority to British Patent Application No. GB 1202328.9 filed on Feb. 10, 2012, all of which are hereby incorporated by reference in their entireties as if fully set forth herein.

BACKGROUND

1. Field

The present invention relates to a container, and in particular to a container suited for the transportation and/or storage of sheet items, particularly fragile delicate or non-uniform shape items such as, for example different sized vehicle windscreens or the like.

2. Related Art

Prior art containers are disclosed in for example EP1737764 and GB2408673. Such containers are particularly suited to shipping and storage of vehicle windscreens. Typically such containers are loaded with windscreens at a large centralised distribution centre and then shipped to a local depot or workshop for fitting as replacement windscreens.

Demand at the large centralised distribution centre is high and large containers are best suited to efficient loading. Containers are moved around the distribution centre between various locations where the appropriate selection of windscreens is 'picked' to demand, dependant upon the requirement at the local depot or workshop. Large containers full of windscreens selected to order can be easily accommodated at larger busier local depots or branches. However for smaller, less busy local depots or branches it would be preferable for smaller containers loaded with fewer windscreens to be shipped. An obvious solution would be for larger containers to be loaded with fewer containers. This would provide for inefficiency at the centralised distribution centre.

An improved container and handling or distribution procedure have now been devised.

SUMMARY

According to a first aspect, the present invention provides a container for transportation and/or storage of items, wherein:
- the container is provided with under slung lifting formations for aiding lifting of the container, and also rotatable support members upon which the container may be moved; and/or
- the container is provided with securing means for like containers positioned in side by side relationship to be releasably secured to one another.

According to a further aspect, the invention provides a method of material handling, the method comprising securing together a plurality of containers in side by side relationship and moving/lifting the containers together between a plurality of picking or loading locations; following loading of the containers with at least some material at the distributed picking/loading locations, disengaging and separating the containers for enabling onward transportation in separation.

In a broader context, the invention can be said to be a procedure for handling items for distribution from a distribution centre, the method comprising marrying a plurality of containers together enabling moving/lifting the containers together between a plurality of picking or loading locations at the distribution centre; following loading of the containers with at least some material at the distributed picking/loading locations, separating the containers for enabling onward transportation of the containers in separation.

Typically the container is rectangular in footprint, being narrow of width and has a relatively long length. When handling in side by side relationship, the long sides of the containers are positioned adjacent one another.

Typically, access for placing items into the container or removing items from the container is provided through an upper portion of the container. For example the container may have an open (or openable) top.

The container may comprise a frame structure, typically defining a base and a periphery. Typically upright corner frame posts are provided.

It is preferred that the securing means is arranged to secure frame members of side by side adjacent containers, for example by means of clamping.

Beneficially the securing means is arranged to secure like containers positioned in side by side relationship such that they can be lifted together. The containers clamped together can therefore be lifted in unison, for example at a picking location/station.

In one embodiment it is preferred that the securing means comprises a securing element mounted or tethered to the container. This provides that separate securing elements for example free clamps or bolts are not required.

In a preferred embodiment the securing element is deployable from a stowed position to a deployed position for securing to an adjacent positioned like container. In the stowed position it is preferred that the securing element lies contiguous with a frame member of the container frame. This ensures that it does not stand proud which would make the securing element susceptible to damage.

In one embodiment, the securing element is pivotally mounted to or hinged to the container frame, in order to be pivoted from the stowed to the deployed position.

It is preferred that the securing element is configured for mating securing engagement with a complementary formation provided on the side by side positioned container. In one embodiment the securing element comprises a retractable bolt or pin (preferably spring biased/loaded) for retractable engagement with a bolt or pin receiving aperture provided on the frame of the side by side positioned like container. The securing element preferably includes a flange or abutment which is moved into position to capture the upright corner post of the container frame of the side by side positioned like container.

It is preferred that a first securing means is provided proximate the base of the container.

It is preferred that a second securing means is provided proximate the top of the container.

Beneficially, the under slung lifting formations comprise tine guides for receiving lifting tines of lifting apparatus, such as the lifting tines of a fork lift device. Typically two tine guides are spaced on the long side of the container and typically provided close to the corners of the container.

It is preferred that a respective rotatable support member is provided for a respective tine guide and positioned adjacently thereto.

Typically, the respective tine guide is positioned outwardly of the respective rotatable support member. In a preferred embodiment, the tine guide includes a bracket formation bracket mounting for the rotatable support member.

The rotatable support members are arranged to ensure that the tine guides are positioned clear above the floor surface enabling the container to be movably supported on the rotatable members.

Typically, the rotatable support members comprise wheels or casters.

Typically, the container has upright corner posts which are adjustable in height.

Typically, the container has upright corner posts which are provided with stacking formations enabling like containers to be stacked one on top of another.

In a preferred embodiment, two pairs of opposed positioned tine guides are provided, a pair on each opposed side of the container.

It is preferred that securing assembly is provided for the container to ensure that when windscreens are stacked in the container they are secured with respect to the container. The securing assembly may comprise a post or other upright assembly to which a securing belt may be fixed, which can be tightened around the windscreens to ensure they are tightly packed. Typically packing material is interleaved between the windscreens when secured in the container. An exemplary securing assembly is disclosed in EP1737764.

The invention will now be described in a specific embodiment, by way of example only and with reference to the accompanying drawings.

DETAILED DESCRIPTION OF THE PREFERRED EMBODIMENT

Figure 1:
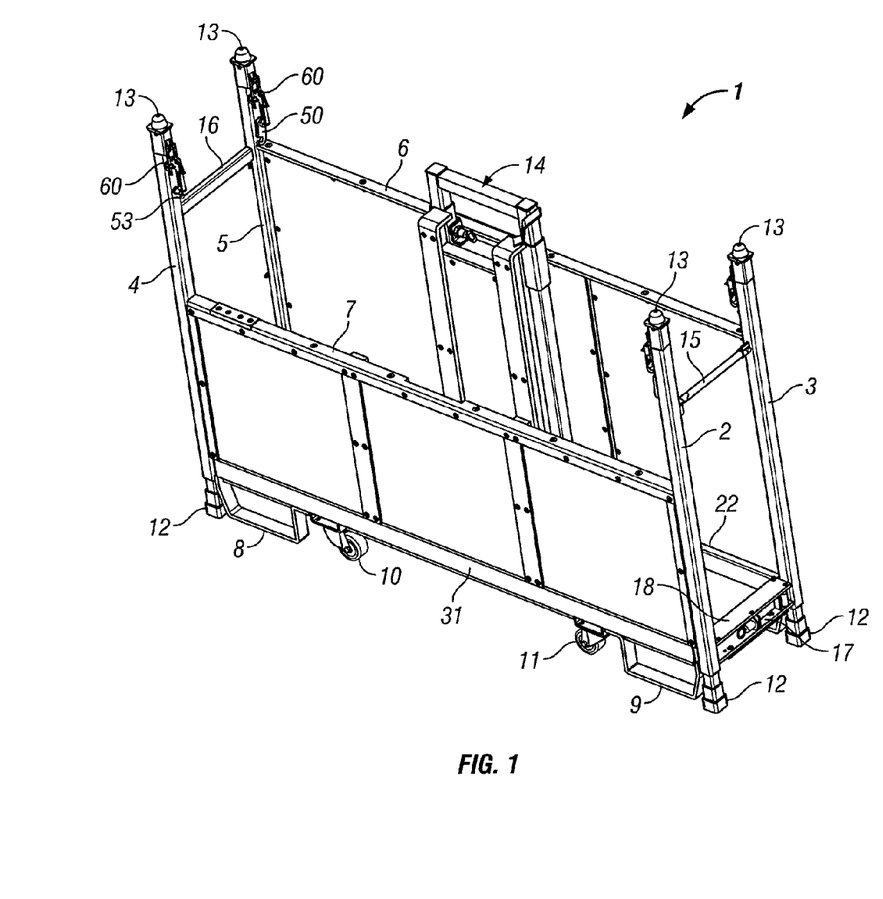
FIG. 1 is a perspective view of a container suited for transportation and/or storage of sheet items such as windscreens, in accordance with the invention.
Figure 2:
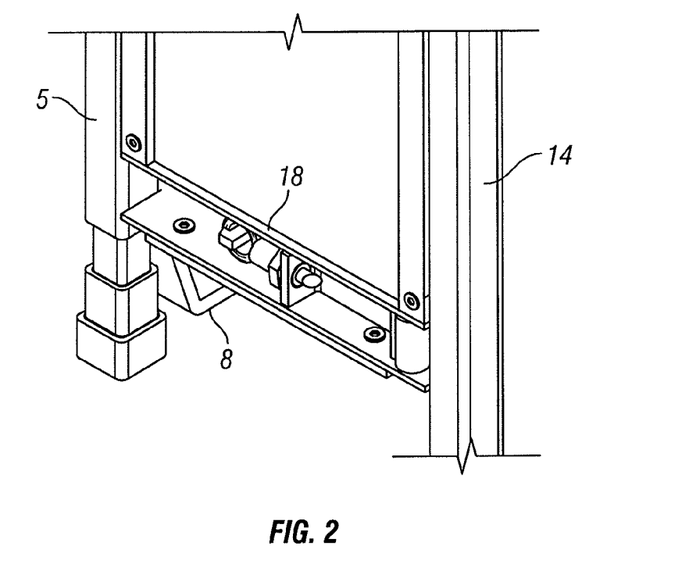
FIG. 2 is a detailed view of part of the container of FIG. 1
Figure 3:
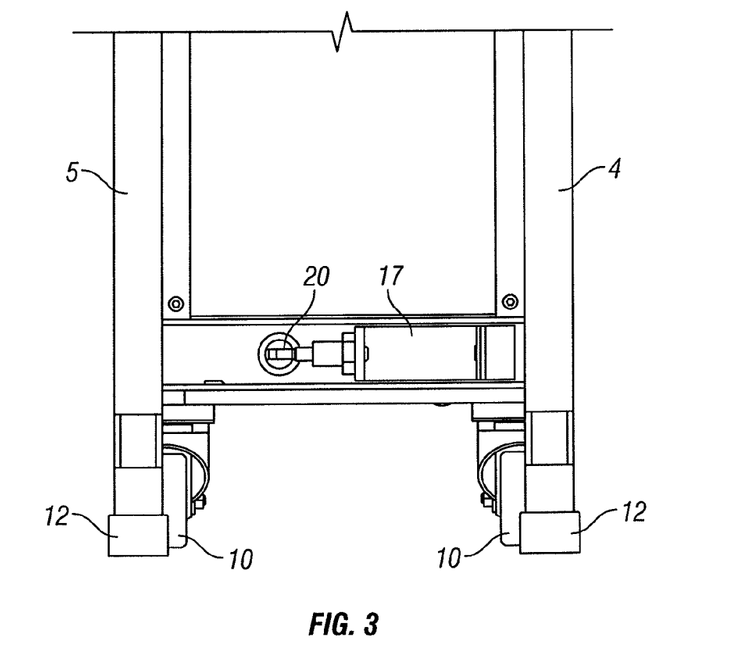
FIG. 3 is a side view of the portion of the container of FIG. 2
Figure 4:
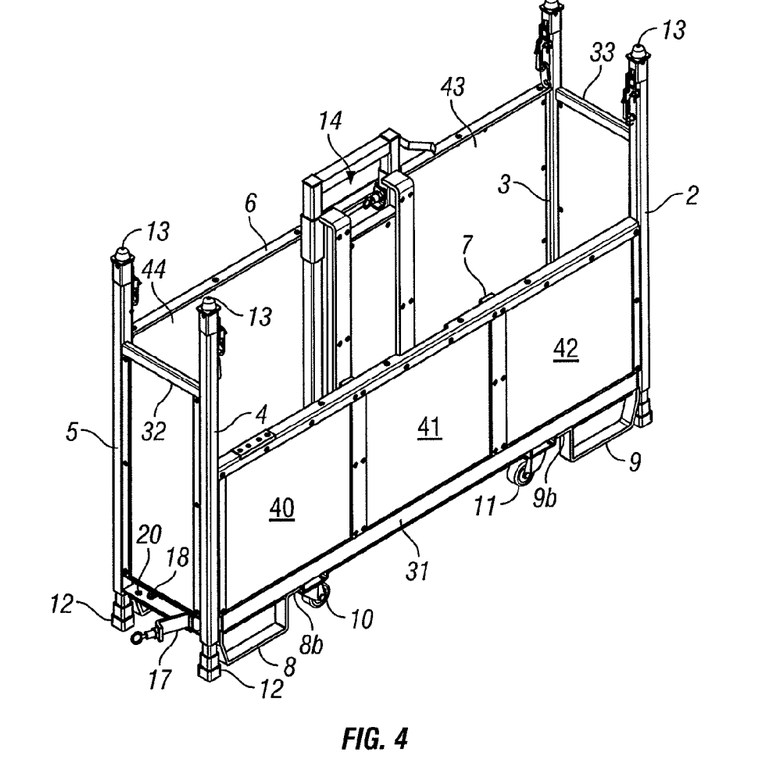
FIG. 4 is a perspective view of the container with the securing element in a partially deployed position

Referring to the drawings in FIG. 1 there is shown a container 1 in perspective view. The container 1 is of frame construction comprising four corner posts 2, 3, 4, 5 elongate side members 31 at the base of the container connecting the corner posts and end frame elements 18 at the base. End stays 32 33 are also provided connecting corner posts 4, 5 and 2, 3 at opposed ends of the container. Along the back of the container there is a higher longitudinal frame element 6 connecting corner posts 5, 3 at opposed ends of the container. A forward longitudinal frame element 7 connects the front corner posts 2, 4. The container is of significantly narrower width than length as can be seen clearly in the diagrams. Side panels 40, 41, 42, 43, 44 are mounted to the frame of the container 1. In certain embodiments one or more of the panels may be omitted.

Figure 10:
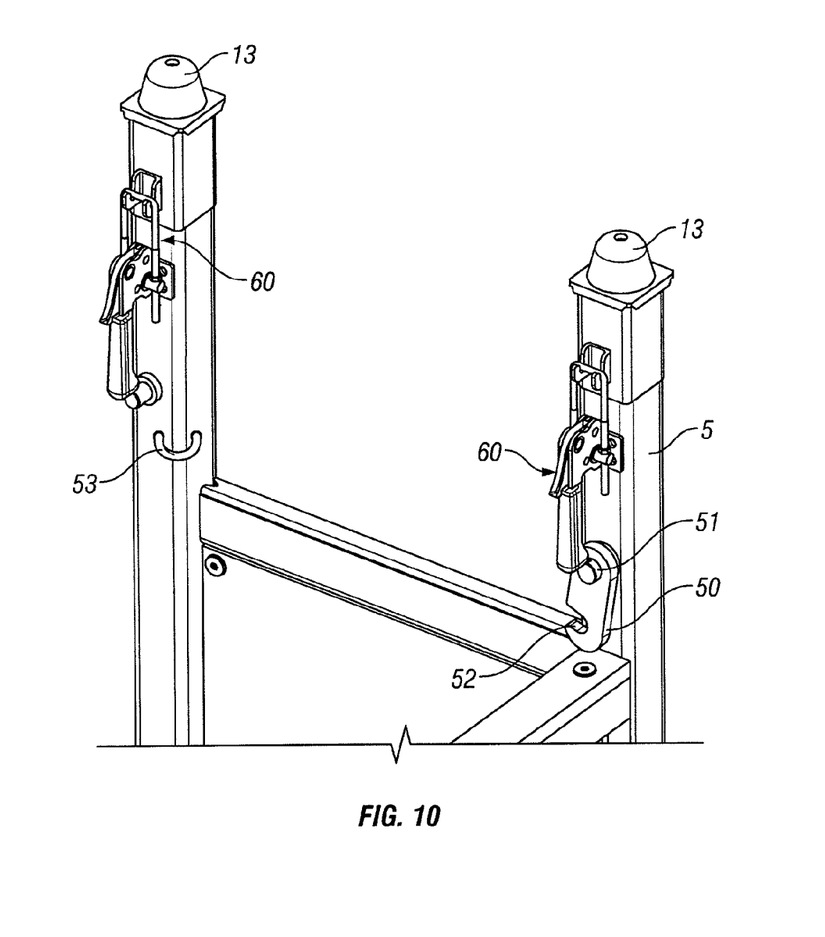
FIG. 10 is a perspective view of the secondary securing means in accordance with the container of the invention.

The corner posts 2, 3, 4, 5 are extendable in length and provided at their uppermost extent with plug formations 13. The upper end portion of each corner post 2, 3, 4, 5 is telescopically received to permit extension of the overall length. A locking catch mechanism 60 (best shown in FIG. 10) is provided to secure the telescopically received end in the non extended position with respect to the respective corner post 2, 3, 4, 5.

At each respective foot of the corner posts 2, 3, 4, 5 a respective end stop socket 12 is provided. The end stop sockets 12 are shaped in dimension to matingly engage with (receive) the plug 13. Therefore like containers 1 can be stacked on top of each other with the plugs 13 engaging in the sockets 12 securely locating the like containers 1 stacked on top of each other.

A securing assembly 14 is provided for the container to ensure that when windscreens are stacked in the container a securing belt fixed to the securing arrangement can be tightened around the windscreens to ensure they are tightly packed. Typically packing material is interleaved between the windscreens when secured in the container. A similar securing assembly is disclosed in EP1737764.

The base of the container is provided with under slung casters 10, 11 and also under slung tine guides 8, 9. Four tine guides 8, 9 are provided two at the front edge of the container closely adjacent the corner posts 2, 3, 4, 5 and two at the rear of the container aligned with the two tine guides at the front of the container. The casters 10,11 are mounted inwardly of the tine guides. The tine guides include a limb extension 8b, 9b which provides a mounting bracket for the casters 10, 11 respectively. The arrangement is such that the container 1 can be moved on the casters 10, 11 with the tine guides 8, 9 standing clear of the floor surface. The tine guides 8, 9 provide for receiving the tines of forklift apparatus such as forklift trucks that are commonly found in distribution centres.

The container 1 is provided at each opposed longitudinal end, with a securing device 17 proximate the base of the container for securing side by side positioned like containers (1a, 1b—see FIGS. 8 and 9) to one and other, for example, for the purpose of container loading at a distribution centre. The side by side securing device 17 provided at each end is shown most clearly in FIGS. 2 to 9. The arrangement comprises, as shown in FIG. 6, a securing element or bracket 17 having a hinge mounting 22 at the proximal end of an arm 21 of the securing element or bracket 17, which is provided at it's distal end with a transversely extending flange portion 25. The flange portion 25 carries a spring loaded translationally movable retractable pin 23 which is mounted in a boss 26 and provided with an actuating pull ring 24. Pulling on the pull ring 24 in the direction of arrow A in FIG. 6 ensures that the pin is retracted back through the flange portion 25 of the securing element, into the boss 26.

As shown in the figures, the securing element or bracket 17 is mounted by the hinge formation 22 to the lower frame element 18 at each end of the container 1. The securing element or bracket 17 is shown in the stowed configuration in FIGS. 2 and 3, the hinge formation 22 being mounted at the end of the frame element 18 closest to the front corner posts 2,4. Securing elements are provided at both longitudinal opposed ends of the container. In a stowed configuration the securing element or bracket 17 is held to be nesting in the recess of the frame section 18 and therefore out of harms way. In this position the securing element or bracket 17 is retained by means of a securing hook 20 which engages with the pull ring 24. By disengaging the pull ring from the hook 20 the securing element or bracket 17 can be pivoted about the hinge formation 22 from a stowed position to a deployed configuration.

Figure 5:
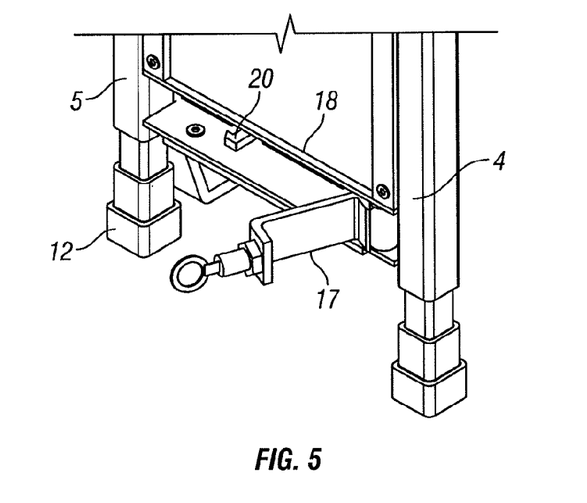
FIG. 5 is a detailed view of the partially deployed securing element of FIG. 4
Figure 6:
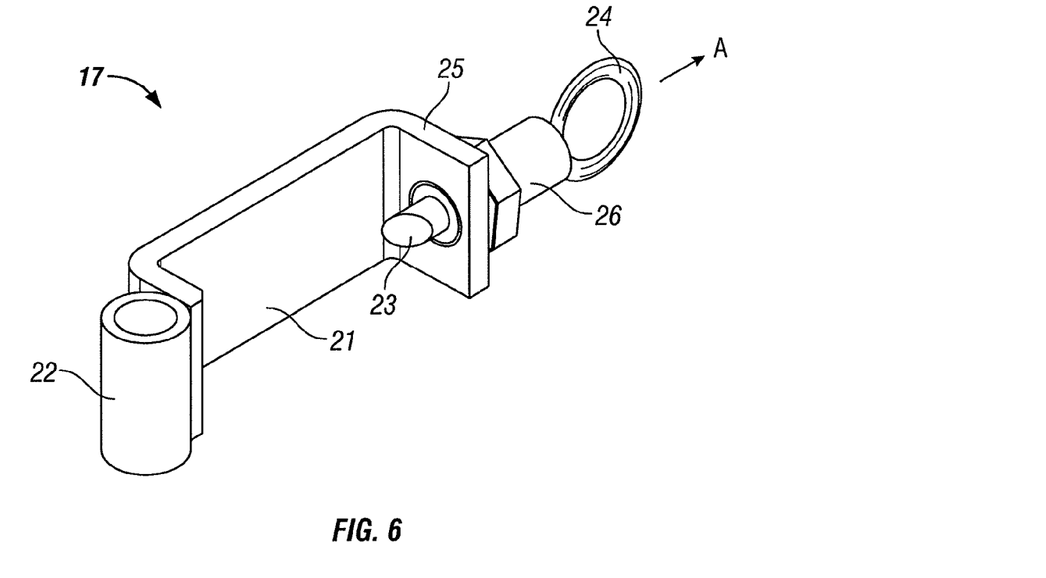
FIG. 6 is a detailed component view of the securing element
Figure 7:
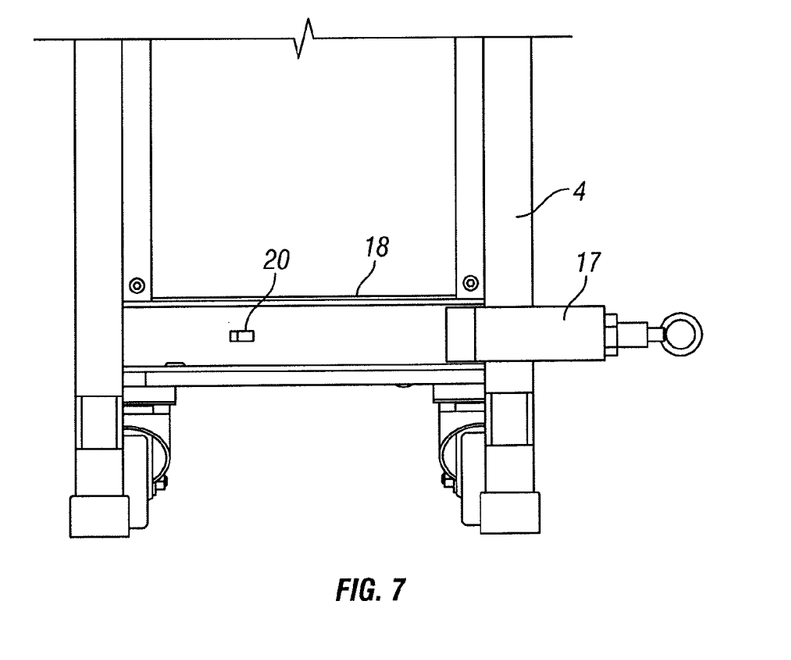
FIG. 7 is an end view of the container with the securing element in the deployed position
Figure 8:
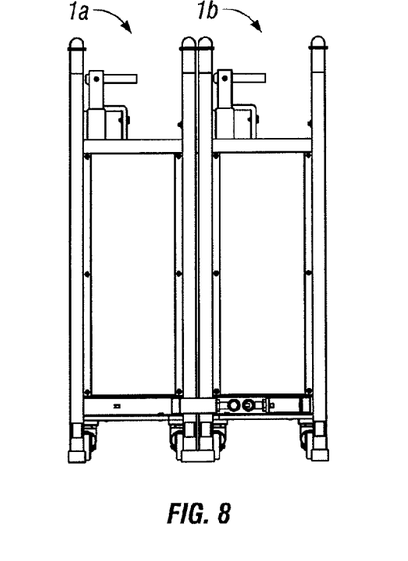
FIG. 8 is an end view of two containers arranged in side by side relationship and clamped using the securing element
Figure 9:
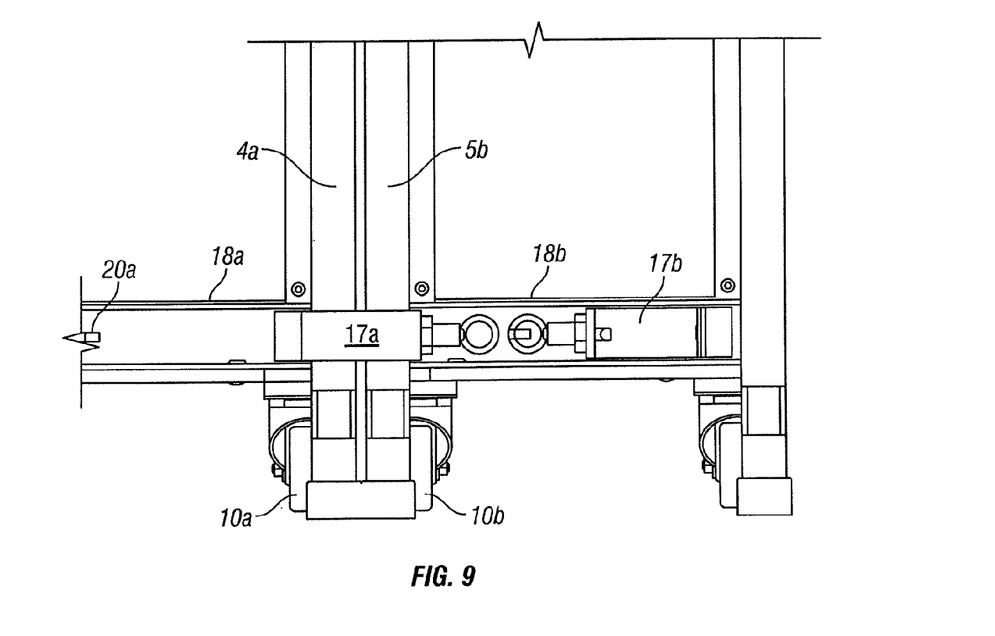
FIG. 9 is a detailed view of the arrangement shown in FIG. 8 showing the clamping of the containers in a side by side relationship

In FIG. 5 the securing element or bracket 17 is shown partially deployed moving to the fully deployed position as shown in FIGS. 7 to 9. In a fully deployed position the securing element or bracket 17 extends outwardly beyond the front longitudinal edge of the container and provides for securing or coupling to the rear corner post 5*b* of a like container positioned in side by side relationship (see FIGS. 8 and 9). In the deployed position the flange 25 of the securing element 17 is positioned adjacent the forward facing surface of the rear corner post 5*b* of the adjacent container 1*b*. This is the configuration shown in FIGS. 8 and 9. The pin 23 is spring loaded to be urged into engagement either with a recess or receiving aperture provided in the corner post 5*b* or alternatively with the far side of the corner post 5*b*. The securing element at the other longitudinal end of the container 1*a* similarly engages to couple with the rear corner post 3*b*. In either event the rigid securing elements/brackets 17 act to effectively and rigidly couple together the forward corner posts 2*a*, 2*b* of a first container and a respective rear post 3*b*, 5*b* of the side by side adjacent container 1*b*.

A secondary coupling means is provided proximate the upper portion of the containers 1*a* 1*b* at both opposed longitudinal ends of the container. This arrangement is shown most clearly in FIG. 10. The arrangement comprises a securing catch 50 mounted on a pivot 51 on the rear corner post 3,5 at each end of the container. The forward corner posts 2, 4 are provided with a hook formation 53 within which the end finger portion 52 of the catch 50 is arranged to locate when the two adjacent containers 1*a*, 1*b* are positioned in side by side relationship. This ensures that the upper portions of the containers 1*a*, 1*b* are coupled together in addition to the primary coupling via the lower securing elements 17.

In use, the containers according to the invention provide for easy and quick coupling. This is partially due to the fact that the securing elements and couplings 17, 50 are providing proximate upper and lower portions of the container and also the fact that the securing elements and couplings are integrally mounted with the container so that separate clamps or fixing arrangements are not required.

In use, two like containers 1*a*, 1*b* are coupled to one and other using the securing means as described and the containers can be moved in unison and lifted in unison using forklift apparatus. The fork lift tines 8 provide for this. This provides for efficient and easy coupling together of pairs of like containers at the distribution centre to enable most efficient loading. The coupled containers can be lifted and moved together between the various picking locations or picking stations and containers filled as a couple with the required various shaped and sized windscreens in accordance with the contents demanded.

As mentioned earlier, demand at large centralised distribution centres is high and large containers are best suited to efficient loading. Containers are moved around the distribution centre between various locations where the appropriate selection of windscreens is 'picked' to demand, dependant upon the requirement at the local depot or workshop. When distributing to local depots or workshops for end use, large containers full of windscreens selected to order can be easily accommodated at larger busier local depots or branches. However for smaller, less busy local depots or branches it would be preferable for smaller containers loaded with fewer windscreens to be shipped. An obvious solution would be for larger containers to be loaded with fewer containers. This would provide for inefficiency at the centralised distribution centre. The present invention provides the best of both worlds in that coupled smaller containers can be handled together for loading at the distribution centre and then decoupled for onward shipping to local depots or workshops.

The containers can then be shipped from a distribution centre either coupled or more likely separately. The containers in accordance with the invention provide for separated containers to be distributed independently to different end user locations. At the end user locations the provision of the casters under slung below the base of the container, enable the containers to be easily moved around in locations where fork lifting apparatus is not provided. Accordingly, containers in accordance with the invention provide for convenient material handling and distribution at opposite ends of the supply chain (distribution centre and local workshop). The invention has been defined specifically in respect of its utility and application to shipping of vehicle windscreens. However, it will be readily appreciated that the invention has the ability to be exploited in other situations and for other container contents

The invention claimed is:

1. A container for transportation and/or storage of items, comprising:
   a plurality of under-slung tine guides configured to receive lifting tines of a lifting apparatus for aiding lifting of the container;
   a plurality of rotatable support members upon which the container may be moved, each one of the rotatable support members corresponding to a respective one of the under slung tine guides and positioned adjacent thereto, at least two of the rotatable support members being disposed between two spaced apart under-slung tine guides; and
   a securing element configured to releasably secure to a further container positioned in side by side relationship with the container such that tine guides of the container and tine guides of the further container are co-aligned with one another, wherein the securing element is mounted on the container and moveable between a stowed position and a deployed position for securing to the further container.

2. A container according to claim 1, wherein access for placing items into the container or removing items from the container is provided through an upper portion of the container.

3. A container according to claim 1, wherein the container comprises a frame structure defining a base and a periphery.

4. A container according claim 1, wherein the securing element is arranged to secure to the further container clamping together frame members of side by side adjacent containers.

5. A container according to claim 1, wherein the securing element is arranged to secure to the further container such that both the container and the further container can be lifted or moved together.

6. A container according to claim 1, wherein the securing element is pivotally mounted or hinged to be pivoted from the stowed position to the deployed position.

7. A container according to claim 1, wherein the securing element is configured for mating engagement with a complementary formation provided on the further container.

8. A container according to claim 3, wherein a securing element is provided proximate the base of the container.

9. A container according to claim 2, wherein a securing element is provided proximate the upper portion of the container.

10. A container according to claim 1, wherein each respective tine guide includes a bracket for mounting the corresponding one respective rotatable support member.

11. A container according to claim 1, wherein the rotatable support members are arranged to ensure that the tine guides are positioned clear above a floor surface enabling the container to be movably supported on the rotatable members.

12. A container according to claim 1, wherein the rotatable support members comprise wheels or casters.

13. A container according to claim 1, wherein the container has upright corner posts which are adjustable in height and include formations enabling the container to be stacked upon a duplicate of the container.

14. A container according to claim 1, wherein the container has upright corner posts which are provided with stacking formations enabling the container to be stacked upon a duplicate of the container.

15. A container according to claim 1, wherein two pairs of opposed positioned tine guides are provided, a pair on each opposed side of the container.

16. A container according to claim 1, wherein the container has a width and a length that is longer than the width.

17. A method of material handling, the method comprising:

securing together a plurality of containers according to claim 1 in side by side relationship;

moving/lifting the containers together between a plurality of picking or loading locations; and     following loading of the containers with at least some material at the distributed picking/loading locations, disengaging and separating the containers for enabling onward transportation in separation.

\* \* \* \* \*